Oct. 26, 1965  J. M. ANDRES  3,214,683
OPTICALLY PUMPED GYROMAGNETIC APPARATUS
Filed March 25, 1960  3 Sheets-Sheet 1

Fig. 1.
F=2 LEVEL OF THE $S_{\frac{1}{2}}$ GROUND STATE

Fig. 2.
F=1 LEVEL OF THE $S_{\frac{1}{2}}$ GROUND STATE

JOHN MILTON ANDRES
INVENTOR.

BY Albert Rosen

ATTORNEY.

Oct. 26, 1965  J. M. ANDRES  3,214,683
OPTICALLY PUMPED GYROMAGNETIC APPARATUS
Filed March 25, 1960  3 Sheets-Sheet 2

JOHN MILTON ANDRES
INVENTOR.

BY Albert Rosen

ATTORNEY.

United States Patent Office 3,214,683
Patented Oct. 26, 1965

3,214,683
OPTICALLY PUMPED GYROMAGNETIC
APPARATUS
John M. Andres, Rolling Hills, Calif., assignor, by mesne assignments, to TRW Inc., a corporation of Ohio
Filed Mar. 25, 1960, Ser. No. 17,591
8 Claims. (Cl. 324—.5)

This invention relates generally to the gyroscopic control art and more particularly to improvements in those control or guidance devices that sense angular motion of a body by utilization of the gyromagnetic properties of atoms or elementary particles.

Gyroscopic devices are known that utilize the gyromagnetic properties of atoms or elementary particles as part of a system to sense angular motion of a body and provide an output guidance control signal. In such devices it is often necessary that the particles be in a particular, preferred orientation with respect to the axis of body rotation in order to maximize the output signal: the output signal being proportional to the angular motion of the body. This preferred particle orientation is generally achieved by means of a unidirectional magnetic field. A variable magnetic field is also applied to the particles causing a precessional motion of the particles which is usually detected by the use of an induction coil pickup.

Such systems have not proven entirely satisfactory. For example, in many of the systems not all the particles are aligned into a preferred orientation thereby limiting the sensitivity of the device. In addition, the use of an induction coil pickup introduces noise which further limits the minimum detectable signal and stray magnetic fields often mask the effect of an angular motion. Because of these inherent limitations, prior devices tend to have less sensitivity than is desired in many applications.

It is a primary object of this invention to provide a gyroscopic arrangement of the type utilizing the gyromagnetic properties of atoms or elementary particles with more reliable means for achieving a preferred orientation of virtually all the particles and more sensitive means for detecting an output signal proportional to the angular motion of a body.

It is a further object of this invention to provide a gyroscopic device of the kind referred to, in which the particular energy required for achieving the preferred orientation of the particles is easily and automatically obtained and maintained and wherein the detection system is substantially free of noise.

It is still a further object of this invention to provide a gyroscopic device of the kind referred to, in which a stray magnetic field or variations in the strength of the unidirectional field have no effect on the accuracy of the measurement of the angular motion.

This invention overcomes the above-described difficulties by utilizing a beam of light and a unidirectional magnetic field to effect a preferred orientation of virtually all particles comprising a magnetic field responsive medium. An alternating magnetic field is applied to the medium inducing a precessional motion of the particles at a given frequency about the unidirectional magnetic field. This precessional frequency changes when the medium is rotated about an axis parallel to the unidirectional magnetic field and these changes in precessional frequency are detected by optical means.

As used herein, a magnetic field responsive medium is defined as a collection of molecules, atoms, nuclei, electrons or elementary particles that: (a) exhibits gyromagnetic properties such as angular momentum, magnetic moments, and precession at a resonant frequency, wherein this resonant frequency is, for a given particle, proportional to a magnetic field strength; and (b) is capable of being optically pumped into a preferred energy condition, alignable by a unidirectional magnetic field means into a preferred orientation and has at least one optically detectable characteristic that is a function of such alignment.

In one embodiment of this invention a magnetic field responsive medium in a container means, as a vapor gas cell, is illuminated by a first right circularly polarized light beam (termed the optical pumping light beam) emitted from a lamp containing a vapor of the same magnetic field responsive medium. The spectral content of this optical pumping light beam is such that it always contains energy in the particular wavelengths required to effect a change in the particles of the medium to a preferred energy state. The medium in the gas cell is also subjected to a unidirectional, homogeneous magnetic field, parallel in direction to the optical pumping light beam. This causes the particles comprising the medium to align themselves with their magnetic moments in a direction substantially parallel to the optical pumping light beams, thereby providing a net magnetic moment of the medium. The combination of the optical pumping light beam and unidirectional magnetic field may be considered together as an optical pumping means.

When the optical pumping light beam has raised virtually all of the particles of the gas cell to the preferred energy condition, the strength of the resultant net magnetic moment is virtually the maximum attainable for a fixed number of particles in the medium. The medium is also subjected to an alternating magnetic field in a direction perpendicular to the direction of the optical pumping light beam and the frequency of the alternating magnetic field is selected to correspond to a precessional frequency of the net magnetic moment about the unidirectional magnetic field.

This precessional frequency is, for any one kind of particle, linearly proportional to the unidirectional magnetic field strength, and the alternating magnetic field induces a precession of the net magnetic moment in a plane perpendicular to the unidirectional magnetic field. A second beam of right circularly polarized light (termed the optical detection light beam), from a lamp also containing the same kind of particles, that comprise the medium, traverses the medium in a direction perpendicular to the optical pumping light beam and impinges on a detector. The amplitude of the detection light beam is thus frequency modulated at the precessional frequency of the medium by the precessing magnetic moment. The output from this detector is utilized either in a manually controlled circuit to control the alternating magnetic field frequency or in a feedback loop for automatic frequency control of the alternating magnetic field. Since an angular rotation of the medium has the same effect on the medium as a magnetic field, when the axis of such an angular rotation is parallel to the unidirectional magnetic field, it appears to the medium that the strength of the unidirectional magnetic field has been changed. This results in a change in the precessional frequency which is sensed by the optical detection light beam and the detector and thereby provides an indication of the rotational motion.

In another embodiment of this invention changes in the amplitude of the optical pumping light beam itself after it traverses the gase cell are measured to indicate the magnitude of rotational motion.

In other embodiments of this invention the effect of stray magnetic fields and variations in the strength of the unidirectional magnetic field, which tend to obscure the measurement of the rotational rate, are eliminated by simultaneous measurement of the changes in the precessional frequencies of two different magnetic field responsive mediums.

These and other embodiments of this invention may be more fully understood by reference to the following description taken in connection with the accompanying drawings, wherein like characters are utilized to indicate similar elements throughout, and in which.

The arrangements of this invention are predicated on certain gyromagnetic characteristics associated with the quantum mechanics properties of the fine and hyperfine atomic structure. Therefore, a brief discussion of this phenomenon is presented prior to a detailed discussion of the embodiments of this invention.

Atomic structure

The structure of an atom may be described as consisting of a rotating, centrally located nucleus with planetary electrons that not only orbit around this nucleus, but also spin on their own axis. Both the nucleus and the electrons are electrically charged masses and, as such, their respective rotations give rise to both angular momentum and magnetic moment characteristics.

By quantum mechanics theory the electrons are arranged around the nucleus in discrete shells, and, further, there is a maximum number of electrons allowable in each shell. When a shell contains this maximum number of electrons, it is termed a "closed shell" and the magnetic moments and spin angular momentum characteristics of each of these electrons in a closed shell is effectively cancelled by the other electrons. Therefore, these electrons in closed shells may be considered inert in the sense that they do not contribute to the particular phenomena associated with the embodiments of this invention. For some of these atoms, the spin angular momentum and magnetic moment of the nucleus are important in the practice of this invention.

Certain atomic structures, however, have the first electron of a new shell outside of a closed shell and, in general, the atoms with this configuration are the alkali metals: sodium, potassium, rubidium, and cesium. These are generally classified in the periodic arrangement of the elements as Group I. Since there are no other electrons in the outermost shell with which this single electron can interact, the orientation of this electron with respect to its nucleus can be readily changed by the application of preselected outside forces.

The orientation of the axis of spin of the outermost electron is generally parallel to the axis of spin of the nucleus. If the direction of rotation of the nucleus and electron is the same, the angular momentum vectors representing the effect of these rotating masses will be in the same direction and thus additive with respect to each other. If the direction of rotation is opposite, the angular momentum vectors will be opposite and subtractive with respect to each other.

Atomic angular momentum

Figure 1:
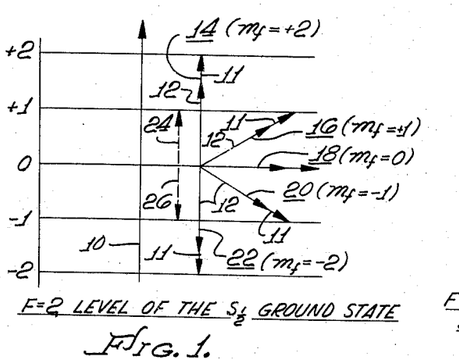
FIG. 1 is a schematic representation of one quantum energy level of a rubidium 87 atom.
Figure 2:
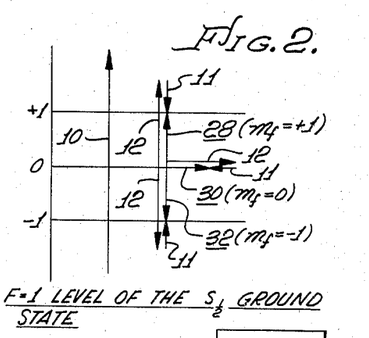
FIG. 2 is a schematic representation of another quantum energy level of the rubidium 87 atom.

FIGS. 1 and 2 show a schematic representation of the angular momentum vectors of a rubidium atom with an atomic weight of 87. Only the effects of the rotating nucleus and rotating outermost electron are considered in these two figures, the inner closed shells being relatively neutral. The rubidium 87 atom has been chosen for illustrative purposes only, and it will be appreciated that other atoms and elementary particles can also be utilized in practicing this invention.

The angular momentum due to the rotation of this nucleus about its axis is assigned a quantum number of three-halves and the spin angular momentum of the outermost electron about its spin axis is assigned a quantum number of one-half. In FIG. 1 the vectors are shown for the condition that the rotation of the electron is in the same direction as the rotation of the nucleus. By definition, the letter "F" equals the vector sum of the nuclear angular momentum and electron spin angular momentum, and the condition shown in FIG. 1 is termed, by those skilled in the art, as the $F=2$ level of the $S_{1/2}$ ground state of this atom. The line 11 represents the vector of the electron spin angular momentum, and the line 12 represents the vector of the nuclear angular momentum. A requirement of quantum mechanics is that the projection of the sum of these two vectors in the direction of an externally applied magnetic field 10 can only occur in discrete, integer values. These are termed the magnetic substates and for the $F=2$ level these values may be: $+2$, $+1$, zero, $-1$, and $-2$. These various magnetic substates are designated the $m_f$ substates of the $F=2$ level. On FIG. 1 for the $F=2$ level the $m_f=+2$ magnetic substate is represented by the line 14; $m_f=+1$ magnetic substate is represented by the line 16; $m_f=$zero magnetic substate is represented by the line 18; $m_f=-1$ magnetic substate is represented by the line 20; and $m_f=-2$ magnetic substate is represented by the line 22. The projections of the $m_f=+2$ magnetic substate and $m_f=-2$ magnetic substate in the direction of the magnetic field 10 are seen to be two units, with the former being in the same direction as magnetic field 10 and the latter being in the opposite direction to the magnetic field 10. The projection of the $m_f=$zero magnetic substate in the direction of the magnetic field 10 is seen to be zero. The projection of the $m_f=-1$ magnetic substate, represented by dotted line 26, is seen to be one unit in a direction opposite to the magnetic field 10; and the projection of the $m_f=+1$ magnetic substate, represented by dotted line 24, is seen to be one unit in the same direction as the magnetic field 10.

In addition to the $F=2$ level of the atom, another possible level exists when the electron spin is in a direction opposite to the nuclear spin. FIG. 2 shows the atomic condition existing when the direction of spin of the electron is opposite to the direction of rotation of the nucleus. In FIGURE 2 the electron spin angular momentum vectors 11 are opposite to the direction of the nuclear rotation angular momentum vectors 12. This state is termed, by those skilled in the art, the $F=1$ level of the $S_{1/2}$ ground state. The laws of quantum mechanics restrict the $m_f$ magnetic substate values in the $F=1$ level of the $S_{1/2}$ ground state to values of $+1$, $0$, and $-1$.

The $m_f=+1$ magnetic substate, represented by line 28, is seen to have a projection of one unit in the direction of the magnetic field 10; the $m_f=$zero magnetic substate, represented by line 30, is seen to have zero projection in the direction of the magnetic field 10; and the $m_f=-1$ magnetic substate, represented by line 32, has a projection of one unit in a direction opposite to the magnetic field 10.

*Atomic magnetic moments*

The strength of the magnetic moments associated with a rotating, charged nucleus and the spinning, charged electrons are inversely proportional to their masses. Since the mass of the particles contributing to the nuclear mass of the rubidium-87 nucleus is several orders of magnitude greater than the mass of the electron, the contribution of the nuclear magnetic moment is negligible with respect to the electron magnetic moment. Thus, the magnetic moments associated with the electron play a predominant role in the practice of this invention where such magnetic moments are present. However, in certain atomic structures the magnetic moments and angular momentum associated with the electron are effectively cancelled out due to the orientation of the electrons and for these type atoms the magnetic moments and angular momentum associated with the nucleus are predominant in the practice of this invention. The direction of the magnetic field associated with an electron is opposite to the direction of its angular momentum vector. The direction of the magnetic moment associated with the nucleus may be either in the same direction or in an oposite direction to its angular momentum vector dependent upon the sign associated with the nuclear spin. In the rubidium-87 atom, for example, the nuclear magnetic moment is in the same direction as the nuclear angular momentum vector. For convenience, in the following description of the embodiments of this invention reference is made to the direction of the angular momentum vector and it will be appreciated that the direction of the net magnetic moment is in accordance with the above described principles. The above discussion delineates the theoretical area of atomic structure being operated on by the present invention In order to provide other than random alignment of the angular momentum and magnetic moment vectors, it is necessary to apply preselected forces to the atoms.

*Optical pumping*

Figure 3:
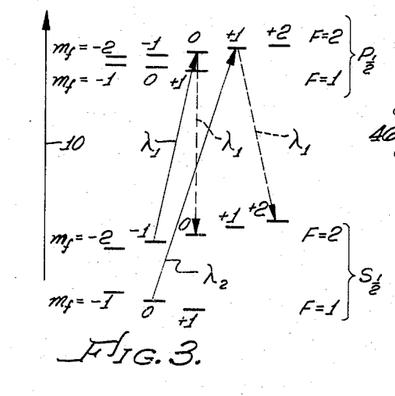
FIG. 3 is a schematic representation of the transitions between various quantum energy states of the rubidium 87 atom.

FIG. 3 shows schematically the transitions of the rubidium-87 atom, described above, from the $S_{1/2}$ ground state ($F=2$ and $F=1$) up to the $P_{1/2}$ first optically excited state. The wavelength of the energy separation between the $F=2$ level of the $S_{1/2}$ ground state and the $P_{1/2}$ first optically excited state is defined as $\lambda_1$; the wavelength of the energy separation between the $F=1$ level of the $S_{1/2}$ ground state and the $P_{1/2}$ first optically excited state is defined as $\lambda_2$. When right circularly polarized light which is comprised of energy substantially concentrated in wavelengths equal to $\lambda_1$ and $\lambda_2$ (shown schematically on FIG. 3 and termed the optical pumping light beam) impinges upon a randomly oriented collection of rubidium-87 atoms, collisions between the atoms and the photons in this light occur. The photon energy associated with the optical pumping light beam of wavelength $\lambda_1$ and $\lambda_2$ is sufficient to raise the energy of the atoms to the $P_{1/2}$ first optically excited state. In the $P_{1/2}$ first optically excited state there exist energy levels corresponding to both the $F=2$ and $F=1$ levels as well as the $m_f$ magnetic substates. However, the energy separation between the $F=1$ and the $F=2$ levels at the $P_{1/2}$ first optically excited state is very much less than the corresponding separation at the $S_{1/2}$ ground state and, in fact, the energy difference between $F=1$ and the $F=2$ levels at the $P_{1/2}$ first optically excited state is virtually unresolvable.

In the practice of this invention it is desirable to optically pump out of the $F=1$ into the $F=2$ level of the $S_{1/2}$ ground state and also to saturate the $m_f=+2$ magnetic substate of the $F=2$ level of the $S_{1/2}$ ground state. Referring to FIG. 1 it can be seen that this $m_f=+2$ magnetic substate of the $F=2$ of the $S_{1/2}$ ground state corresponds to a maximum angular momentum energy condition. In order to achieve this saturation of the $m_f=+2$ magnetic substate of the $F=2$ level of the $S_{1/2}$ ground state, certain characteristics must be present in the light of wavelengths $\lambda_1$ and $\lambda_2$. These characteristics are achieved by utilizing the right circularly polarized light as the pumping light beam. When $\lambda_1$ and $\lambda_2$ are right circularly polarized, the angular momentum characteristics of the photons associated with these two wavelengths are such that on collision with the atoms, the atoms can only gain one $m_f$ magnetic substate number in being excited to the $P_{1/2}$ first optically excited state. On subsequent collapse of the atoms to the $S_{1/2}$ ground state (during which radiation is emitted from the atoms at approximately wavelengths $\lambda_1$ and $\lambda_2$), they can return to either the $F=1$ or $F=2$ level of the $S_{1/2}$ ground state at an $m_f$ magnetic substate either one greater, one less, or the same as it occupied at the $P_{1/2}$ first optically excited state. Statistically, there is equal probability of an atom returning to any one of these three magnetic substates. (Since atoms already in the $m_f=+2$ magnetic substate of the $F=2$ level of the $S_{1/2}$ ground state can not gain one $m_f$ magnetic substate number, they are not raised to the $P_{1/2}$ first optically excited level.) It may be seen, then, that as this pumping action continues, virtually all atoms will tend to populate the $m_f=+2$ magnetic substate of the $F=2$ level of the $S_{1/2}$ ground state, which is the desired preferred energy condition for the angular momentum and magnetic moment vectors of each individual atom.

The magnetic moment vectors referred to above that are associated with these atoms are parallel to the angular momentum vectors shown on FIGS. 1 and 2 and have a direction as previously described. When an external unidirection magnetic field that is parallel to the optical pumping light beam is present, these magnetic moments are aligned in a direction parallel to the external unidirectional magnetic field. Therefore, when atoms have been pumped into the $m_f=+2$ magnetic substate of the $F=2$ level of the $S_{1/2}$ ground state and an external unidirectional magnetic field 10 (FIG. 1) is then applied, the atoms will be aligned to give a resultant net angular momentum and net magnetic moment equal to the sums of the contributions from each of the individual atoms parallel to this external magnetic field. As long as the pumping light beam remains focused on the gas cell, this orientation will be retained despite the tendency of the atoms to attain a random distribution in the various $m_f$ magnetic substates due to inter-atomic collisions.

*Precessional frequency*

If the geometric relationship between the aligned direction of the net magnetic moment and the direction of the unidirectional magnetic field and optical pumping light beam is disturbed, the net magnetic moment always attempts to reorient itself in a direction parallel to the unidirectional magnetic field. However, the net angular momentum characteristic tends to resist a change in direction and, as a result, the net magnetic moment precesses about the unidirectional field in a movement analogous to conventional gyroscopes. The precessional frequency, termed by those skilled in the art the Larmor frequency, is a function of two quantities: the strength of the unidirectional magnetic field and the gyromagnetic ratio $\Gamma$. The gyromagnetic ratio $\Gamma$ is defined the ratio of the magnetic moment to the angular momentum for the particular particle comprising the magnetic field responsive medium. This gyromagnetic ratio $\Gamma$ is constant for the particular particle and, in accordance, the following relationship is established:

$$f = \Gamma H$$

Where
- $f$ = the precessional frequency (Larmor frequency)
- $\Gamma$ = gyromagnetic ratio
- $H$ = unidirectional magnetic field strength.

The Larmor frequency $f$ for a given particle, then, increases as the unidirectional magnetic field strength increases. Thus, changes in the Larmor frequency are indicative of external forces that appear to the magnetic field responsive medium as an additional magnetic field superimposed on a constant unidirectional magnetic field.

*Equivalence of magnetic field strength to angular rotation rate*

When an aligned magnetic field responsive medium is rotated about an axis parallel to the direction of alignment, it appears to the medium that there is an equivalent magnetic field parallel to the axis of rotation. The strength of this equivalent magnetic field is computed from the same equation, set out above, used to compute the Larmor frequency; and is usually expressed:

$$H_{eq} = \frac{\Omega}{\Gamma}$$

Where
- $H_{eq}$ = equivalent magnetic field strength
- $\Omega$ = angular rotation rate If an aligned, precessing magnetic field responsive medium together with its unidirectional magnetic field and optical pumping light beam are rotated about an axis parallel to the unidirectional magnetic field, the precessional frequency is induced to change from the static or rest precessional frequency and is equal to:

$$f_1 = \Gamma H \pm \Omega$$
$$f_1 = f_0 \pm \Omega$$

Where $f_1$ = precessional frequency (Larmor frequency) during rotation at an angular rotation rate $\Omega$ and $f_0$ = the rest precessional frequency. If $f_0$ is known, detection and measurement of the changed precessional frequencies is a measure of the angular rotation.

*Optical detection*

As the net magnetic moment of the magnetic field responsive medium precesses about the unidirectional magnetic field, it may, in the general case, have a component parallel to and a component perpendicular to the unidirectional magnetic field, or it may, under particular circumstances, have no component parallel to the unidirectional magnetic field. In accordance with the principles of this invention, the perpendicular component of the precessing net magnetic moment is detected by optical means. In one method of detecting this component a right circularly polarized light beam, the detecting light beam, containing energy substantially concentrated in a wavelength equivalent to $\lambda_1$ (of FIG. 3) is oriented to traverse the magnetic field responsive medium in a direction perpendicular to the unidirectional magnetic field. As the net magnetic moment precesses about the unidirectional magnetic field direction, at the Larmor frequency, the component perpendicular to the unidirectional magnetic field direction alternately appears to be first in the same direction and then in the opposite direction to the detection light beam. When it is in the same direction as the detection light beam it appears to be in the $m_f = +2$ magnetic substate of the $F=2$ level of the $S_{1/2}$ ground state and therefore no energy is absorbed from the detection light beam. However, when it appears to be in the opposite direction to the detection light beam, it appears to the detection light beam as if it were in the $m_f = -2$ magnetic substate of the $F=2$ level of the $S_{1/2}$ ground state and, hence, energy is absorbed from the detection light beam as it tries to pump these up to the $P_{1/2}$ first optically excited state in a manner analogous to the optical pumping described above. This absorption of energy reduces the intensity of the detection light beam.

As noted above, the precessional frequency of the net magnetic moment is at the Larmor frequency; the intensity of the detection light beam, then, is effectively modulated at the Larmor frequency after it traverses the collection of atoms. A detector that is sensitive to at least the wavelength $\lambda_1$ is oriented to receive the detection light beam after it so traverses the magnetic field responsive medium. This detector senses the modulated intensity of the detection light beam, and this modulated intensity is a measure of the angular rotation rate as described above. In another detection method the energy absorbed by the precessing net magnetic moment from the optical pumping light beam is detected and this provides a constant amplitude signal with a minimum value at the Larmor frequency.

*Induced precession*

Precession of the net magnetic moment about the unidirectional magnetic field occurs when the geometrical relationship of the unidirectional magnetic field and the aligned direction of the net magnetic moment is disturbed. One method of causing this disturbance is by simultaneously applying an alternating magnetic field to the magnetic field responsive medium in a direction perpendicular to an applied unidirectional magnetic field and optical pumping light beam. The frequency of the alternating magnetic field is selected as the Larmor frequency corresponding to the strength of the unidirectional magnetic field. When this alternating magnetic field is applied to the medium, a complex motion of the net magnetic moment vector is initiated. The net angular momentum characteristic of the particles comprising the medium tend to resist any change in the direction of alignment while, simultaneously, the net magnetic moment forces tend to realign the net magnetic moment vector.

The resultant motion of the net magnetic moment vector may be considered as a double precessional motion: one precessional motion, at the Larmor frequency, about the unidirectional magnetic field and a second precessional motion, at a frequency proportional to the strength of the alternating magnetic field about this field. In a comparatively short period of time this complex motion damps out and the net magnetic moment vector assumes a stable, single precessional motion about the unidirectional magnetic field at the Larmor frequency.

When the frequency of the alternating magnetic field is precisely the Larmor frequency corresponding to the strength of the unidirectional magnetic field, the net magnetic moment vector precesses in a plane perpendicular to the direction of the unidirectional magnetic field (and parallel to the direction of the alternating magnetic field). Under these conditions, the detecting light beam, which also traverses the medium in a direction perpendicular to the unidirectional magnetic field, is modulated at the Larmor frequency. If the output of a detector that senses the detecting light beam is utilized in a feedback system to an alternating magnetic field generator means that supplies the alternating magnetic field, the system is said to oscillate at the Larmor frequency corresponding to the instantaneous value of the unidirectional magnetic field strength.

The pumping light beam is also affected by the precessional motion of the net magnetic moment vector. When this vector is in a plane perpendicular to the direction of the unidirectional magnetic field, it appears to the pumping light as if it were in the $m_f = 0$ magnetic substate of the $F=2$ level of the $S_{1/2}$ ground state. Therefore, energy is uniformly absorbed from the pumping light beam as it attempts to pump the medium up to the $P_{1/2}$ first optically excited level, as described above. Consequently, a measure of the amount of light absorbed by the medium may also be utilized as indicative of certain characteristics of the medium, such as the gyromagnetic ratio, when the unidirectional magnetic field strength and the Larmor frequency are known.

While rubidium-87 has been utilized in the above examples describing the phenomena of magnetic moment alignment, it will be appreciated that all the alkali metals such as potassium, sodium, and cesium may also be similarly utilized. In addition it has been found that metastable helium, thallium vapor, cadmium vapor and mercury vapor are also capable of being so aligned by optical pumping radiation and a unidirectional magnetic field. Further, free electrons and other elementary particles may also be aligned by optical pumping. Therefore this invention is not limited to the atoms of any one element or group of elements, but all particles with a net angular momentum and net magnetic moment capable of being optically pumped and aligned in a particular preferred direction are useful in practicing this invention.

It will be appreciated that this invention has many applications. For example, measurement of angular motion as in a tachometer, measurement of magnetic field strength, measurement of the gyromagnetic ratio, or in single or multiple axes gyroscopic control system and the like. Many other applications will be apparent to those skilled in the art. Consequently, it is intended that the following specific embodiments be taken as illustrative only, and not in a limiting sense.

*Gyromagnetic method and apparatus*

Figure 4:
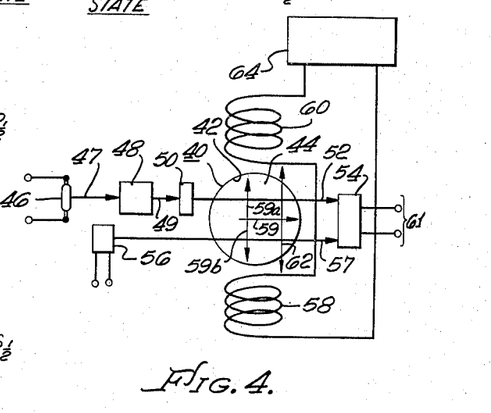
FIG. 4 is a schematic representation of an embodiment of this invention useful in measuring magnetic field strengths.

The physical principles and the gyromagnetic characteristics of a magnetic field responsive medium as described above are utilized in this invention. FIG. 4 illustrates in schematic form the apparatus associated with one embodiment of this invention as utilized in a measuring device for the measurement of a magnetic field strength or a gyromagnetic ratio. A gas cell means 40 has walls 42 defining a cavity. The walls 42 are transparent to magnetic energy and at least to specified wavelengths of electromagnetic radiation. Contained within the gas cell 40 is a magnetic field responsive medium 44. This magnetic field responsive medium 44 exhibits a net magnetic moment that is alignable into a preferred orientation when subjected to a unidirectional magnetic field and an optical pumping light. For purposes of illustration, it may be considered that the medium 44 is gaseous rubidium having an atomic weight of 87 (rubidium 87). Such atoms are alignable into the $m_f = +2$ magnetic substate of the $F=2$ level of the $S_{1/2}$ ground state by subjecting them to a proper optical pumping light beam and unidirectional magnetic field. According to this invention, the particular wavelengths required in the optical pumping light beam are automatically obtained from an optical pumping lamp means 46 which also contains rubidium-87 atoms. When these atoms in the pumping lamp 46 are electrically excited by an electrical energy source (not shown) they are raised to higher energy states from the $S_{1/2}$ ground state and one of these higher states is the $P_{1/2}$ first optically excited state. In this process electromagnetic radiation 47, which includes energy in wavelengths equivalent to $\lambda_1$ and $\lambda_2$ of FIG. 3, along with other wavelengths, are emitted by the optical pumping lamp means 46.

The optical pumping lamp means 46 is oriented so that the electromagnetic radiation 47 emitted from the lamp 46 passes through a right circular polarizer means 48 which converts the electromagnetic radiation 47 into a right circularly polarized light beam 49. This right circularly polarized light beam 49 then passes through a filter means 50 which transmits substantially only energy of wavelengths equivalent to $\lambda_1$ and $\lambda_2$ of FIG. 3. The combination of the optical pumping lamp means 46, polarizer 48, and filter 50 may be conveniently incorporated into a single unit which may be considered as an optical pumping light beam generator means. This filtered light beam, the optical pumping light beam 52, is oriented with respect to the gas cell 40 so that it traverses the medium 44 within the gas cell means 40. The walls 42 of gas cell 40 are transparent to at least electromagnetic radiation of wavelengths equal to $\lambda_1$ and $\lambda_2$ of FIG. 3. An optical light beam detector means 54 which is responsive to electromagnetic energy in at least wavelengths $\lambda_1$ and $\lambda_2$ is oriented to receive the optical pumping light beam 52 after it traverses the gas cell means 40. A unidirectional magnetic field generator means 56 is oriented to emit a unidirectional magnetic field 57 that traverses the gas cell means 40 in a direction substantially parallel to the optical pumping light beam 52. The combination of the optical pumping light beam 52 and the unidirectional magnetic field 57 aligns the particles comprising the magnetic field responsive medium 44 so that there is a net magnetic moment and angular momentum vector 59 of the magnetic field responsive medium 44 parallel to the direction of the unidirectional magnetic field 57.

An alternating magnetic field generating means, illustrated schematically as a pair of coils 58 and 60, is oriented with respect to the gas cell means 40 so that an alternating magnetic field 62 traverses the gas cell means 40 in a direction perpendicular to the direction of the unidirectional magnetic field 57. The coils are powered by a typical signal generator means 64.

In operation the magnetic field responsive medium 44 is simultaneously subjected to the optical pumping light beam 52, the unidirectional magnetic field 57 an the alternating magnetic field 62. Under these conditions the net magnetic moment 59 of the magnetic field responsive medium 44 undergoes a complex precessional motion as described above. After a comparatively short period of time this complex precessional motion damps out and the net magnetic moment vector 59 assumes a stabilized precessional motion in an orientation illustrated by the vectors 59a and 59b on FIG. 4. This orientation is achieved when the frequency of the alternating magnetic field 62 is the Larmor frequency corresponding to the strength of the unidirectional magnetic field 57. It will be appreciated that the net magnetic moment 59 is, under these conditions, actually precessing about the direction of the unidirectional magnetic field 57 in a plane perpendicular to the plane of the paper. Since the unidirectional magnetic field strength 57, the gyromagnetic ratio of the magnetic field responsive medium 44, and the frequency of the alternating magnetic field 62 are related measurement or knowledge of any two of these quantities will yield the third.

Figure 5:
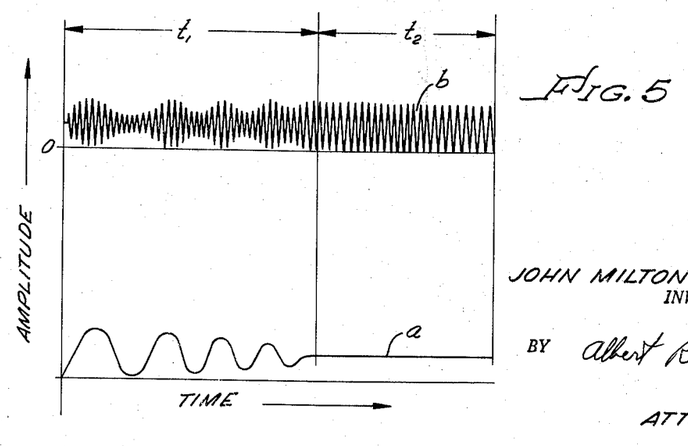
FIG. 5 shows at $a$ and $b$ the waveforms associated with the operation of various embodiments of this invention.

A detector 54 measures the intensity of the optical pumping light beam 52 after it traverses the magnetic field responsive medium 44. When the net magnetic moment vector 59 is precessing in a plane perpendicular to the unidirectional magnetic field 57, it appears to the optical pumping light beam 52 as if it were in the $m_f = 0$ magnetic substate of the $F=2$ level of the $S_{1/2}$ ground state. Therefore, a certain amount of energy is uniformly absorbed from the optical pumping light beam 52 as it attempts to pump these atoms into the $m_f = +2$ magnetic substrate. The detector 54 measures the changed intensity of the optical pumping light beam 52 and provides an output signal, through electrical leads 61, that is proportional to this changed intensity. The leads 61 may be connected to well known devices, such as an oscilloscope for visual display which would have the appearance as illustrated on curve *a* of FIG. 5.

During the time interval $t_1$, the net magnetic moment vector 59 is undergoing the complex precessional motion and thus appears as an alternating output signal. After this has damped out, the net magnetic moment vector 59 assumes the stabilized precessional motion illustrated by the vectors 59a and 59b. The output signal during the stabilized precessional motion is shown on curve *a* of FIG. 5 during the time interval $t_2$. By slowly varying the frequency of the alternating magnetic field 62 the condition of maximum absorption of energy from the pumping light beam 52 can be detected and the frequency when this occurs corresponds to the Larmor frequency for the particular strength of the unidirectional magnetic field 57. Once this frequency is measured, if the gyromagnetic ratio of the magnetic field responsive medium 44 is known, the strength of the unidirectional magnetic field 57 may be computed. If the strength of the unidirectional magnetic field 57 is known, the gyromagnetic ratio of the magnetic field responsive medium 44 may be computed.

While the above described embodiment may be utilized to measure the strength of a unidirectional magnetic field or the gyromagnetic ratio of a magnetic field responsive medium by detecting changes in the intensity of an optical pumping light beam after it traverses the magnetic field responsive medium, other arrangements for measuring magnetic field strength and gyromagnetic ratio are also possible. One such embodiment measures the changes in an optical detection light beam after it traverses the magnetic field responsive medium in a direction perpendicular to the direction of an applied unidirectional magnetic field. The apparatus associated with this embodiment is shown on FIG. 6.

Figure 6:
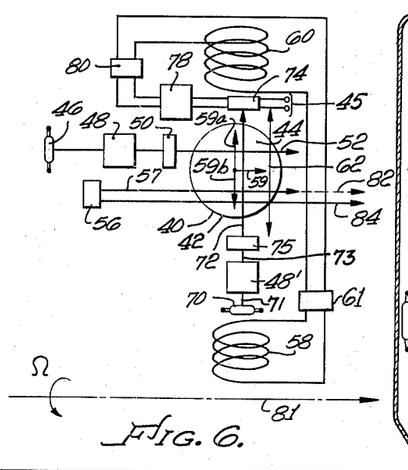
FIG. 6 is a schematic representation of a steady state rotational rate measuring embodiment of this invention.

In FIG. 6, the gas cell means 40 with walls 42 is similar to the gas cell means shown on FIG. 4. The gas cell 40 contains a magnetic field responsive medium 44. An optical pumping lamp means 46, a right circular polarizer means 48 and a filter means 50 are oriented to subject the magnetic field responsive medium 44 to an optical pumping light beam 52 that traverses the magnetic field responsive medium 44 in a preselected direction. A unidirectional magnetic field generator means 56 is oriented to subject the magnetic field responsive medium 44 to a unidirectional magnetic field 57 that traverses the magnetic field responsive medium 44 in the preselected direction. An alternating magnetic field generating means, such as the coils 58 and 60, is oriented with respect to the gas cell means 40 to subject the magnetic field responsive medium 44 to an alternating magnetic field 62 that traverses the magnetic field responsive medium 44 in a direction perpendicular to the preselected direction. An optical detection lamp means 70, which is similar to the pumping lamp means 46, also contains particles of the same kind that comprise the magnetic field responsive medium 44. When these particles are excited by an electrical energy source (not shown) they emit electromagnetic radiation 71, which contains energy in wavelengths equivalent to $\lambda_1$ and $\lambda_2$ of FIG. 3.

The emitted electromagnetic radiation 71 is oriented to pass through a right circular polarizer means 48', which converts the emitted electromagnetic radiation 71 into a right circularly polarized light beam 73. In the preferred embodiment of this invention, a detection light filter means 75 is oriented to receive the right circularly polarized light beam 73 and to transmit substantially only energy in wavelengths equivalent to $\lambda_1$ of FIG. 3. The filtering of the output from the detection lamp means 70 is not necessary to a successful practice of this invention. After passing through the filter means 75, the electromagnetic radiation emitted by the optical detection lamp means 70 is termed the optical detection light beam 72 and it is oriented to traverse the medium 44 in a direction perpendicular to the preselected direction.

An optical detector means 74, sensitive to at least electromagnetic radiation of wavelength $\lambda_1$, is oriented to receive the optical detection light beam 72 after it traverses the magnetic field responsive medium 44. The detector means 74 detects changes in the characteristics of the optical detection light beam 72, such as the intensity, and provides an output signal proportional to such intensity. This output signal is fed into a signal amplifier means 78 and a phase control means 80 and then is utilized to power the coils 58 and 60, which generate the alternating magnetic field 62.

In operation the magnetic field responsive medium 44 is simultaneously subjected to the optical pumping light beam 52, the unidirectional magnetic field 57, and the optical detection light beam 72. Since the output from the detector means 74 powers the coils 58 and 60, a signal is generated to initiate an alternating magnetic field 62 in a direction perpendicular to the unidirectional magnetic field 57. (In some applications a separate starter means, such as the trigger pulse means 61 shown on FIG. 6, may be desired to initiate the alternating magnetic field 62.) This induces a complex precessional motion of the net magnetic moment vector 59 of the magnetic field responsive medium 44. In a short period of time, on the order of a millisecond, the complex precessional motion damps out and the net magnetic moment vector 59 precesses about the unidirectional magnetic field 57 in a plane perpendicular to the paper. This is shown on FIG. 6 as vector 59a as it would appear at one part of its precessional cycle and magnetic moment vector 59b as it would appear 180° of rotation later. This condition occurs when the frequency of the alternating magnetic field 62 generated by the coils 58 and 60 is at the Larmor frequency corresponding to the strength of the unidirectional magnetic field 57 and the phase of the alternating magnetic field 62 is in phase with the precessing net magnetic moment vector 59 (which is insured by the phase control means 80).

Outputs 45 from the detector means 74 are provided to allow, for example, a visual presentation of the detector output signal. Such a presentation might be made on an oscilloscope and appears as shown in curve $b$ of FIG. 5. Since the precessing magnetic moment 59 alternately appears to the optical detection light beam 72 as in the $m_f=+2$ magnetic substate (vector 59a) and then, a half cycle of the precession later, as in the $m_f=-2$ magnetic substate (vector 59b), the intensity of detection light beam is modulated at the Larmor frequency as it attempts to pump the magnetic moment vector 59b into the $m_f=+2$ magnetic substate.

In a manner analogous to that described in connection with the embodiment shown on FIG. 4, this frequency information may be utilized in conjunction with the gyromagnetic ratio of the magnetic field responsive medium 44 or the strength of the unidirectional magnetic field 57 to compute the unknown quantity of these three inter-related quantities.

It will be appreciated that the frequency actually detected by detector means 74 corresponds to the frequency of the alternating magnetic field 62, which may be considered as a driving frequency. When this frequency is exactly at the Larmor frequency, it is the Larmor frequency that is detected. However, due to non-homogeneity of the unidirectional magnetic field, the relaxation time of the magnetic field responsive medium, and certain other characteristics, there is a narrow bandwidth of frequencies, centered about and with a peak at the Larmor frequency, that will also provide an output signal. Depending on the method of detection, this peak may be seen as the maximum amplitude when the output signal from the detector means 74 varies with the precessional frequency (as shown on FIG. 6), or as the maximum energy absorption when the output from the detector means 54 is constant (as shown on FIG 4). Frequencies of the alternating magnetic field 62 other than those within this comparatively narrow bandwidth do not affect the magnetic field responsive medium 44. The bandwidth may be further narrowed, in any of the embodiments described herein, by the inclusion of a buffer gas in the gas cell with the magnetic field responsive medium 44. The buffer gas tends to increase the exposure time of the magnetic field responsive medium 44 to the various magnetic fields and light beams and thereby tends to limit the amount of misalignment that is normally obtained. There are many buffer gases suitable for utilization in this invention, and these include the noble gases such as argon, neon, krypton, nitrogen, helium. Such gases may generally be classified as non-magnetic field responsive mediums.

In addition to these applications of this invention, the principles defined are uniquely utilized in other applications, such as a device for measuring angular motion. In one such embodiment, the apparatus illustrated in FIG. 6 is rotated about an axis 81 with a constant angular rotation rate Ω and the axis 81 is parallel to the direction of the unidirectional magnetic field 57. In accordance with the principles set out above, there is an equivalence of angular rotation of a magnetic field. Thus, an equivalent magnetic field, as shown by the dotted line 82, is established. Therefore, the magnetic field responsive medium 44 experiences an effective unidirectional magnetic field 84 that is parallel in direction to the unidirectional magnetic field 57 and the strength of the effective magnetic field 84 is equivalent to the vector sum of the unidirectional magnetic field 57 and the equivalent magnetic field 82. Since the precessional frequency of the net magnetic moment vector 59 when it is precessing in a plane perpendicular to the paper (as schematically illustrated by vectors 59a and 59b) is proportional to a magnetic field strength, the precessional frequency is dependent, in this embodiment, upon the strength of the effective magnetic field 84 rather than only the unidirectional magnetic field 57. Therefore, the precessional frequency increases in value over the precessional frequency corresponding to the unidirectional magnetic field 57 by an amount proportional to the equivalent magnetic field 82. This is detected by the detector means 74. The output signal from the detector 74 may be presented through leads 45, for example, an oscilloscope for visual presentation. By knowing the gyromagnetic ratio of the magnetic field responsive medium 44 and the strength of the unidirectional magnetic field 57, the increase in the precessional frequency caused by the equivalent magnetic field 82 may be computed. Since the change in precessional frequency of the net magnetic moment vector 59 is caused by changes in the strength of the effective magnetic field 84, it is apparent that anything that causes a change in the strength of the effective magnetic field 84 will also cause a change in the precessional frequency. Therefore, when very small rotational rates are to be measured, such that the strength of the equivalent magnetic field 82 is of the same order of magnitude as any changes that might be present in the strength of the the unidirectional magnetic field 57, it becomes impossible to distinguish the effect of a rotation from the effect of changes in the strength of the unidirectional magnetic field 57.

There are many control methods in which the detection of the precessional frequency of a magnetic moment may be utilized to control an alternating magnetic field so as to determine the Larmor frequency of a magnetic field responsive medium corresponding to the strength of a unidirectional magnetic field. One such control method that is applicable to the detection of the constant energy absorption from the pumping light beam 52 (as shown on FIG. 4) and the detection of the variable intensity detection light beam 72 (as shown on FIG. 6) is to utilize a visual display means such as an oscilloscope for presentation of the detector 54 or 74 output signal and then to manually adjust a signal generator means 64 (shown on FIG. 4) to the frequency corresponding to the Larmor frequency as determined from the visual presentation. Another method of controlling the precessional frequency is to electrically couple the detector 54 or 74 output to the signal generator means 64 so that the frequency of the signal generator means 64 is automatically maintained at the Larmor frequency.

Still another control method that is applicable where the detector senses the variable intensity detection light beam 72 is to electrically couple the output of detector 74 through an amplifier means 78 and phase control means 80 as shown on FIG. 6 directly to the alternating magnetic field generator means such as coils 58 and 60. This provides an automatic control of the frequency of the alternating magnetic field 62 corresponding to the Larmor frequency. Each of these control methods may, where applicable, be utilized in any of the embodiments described herein.

Figure 7:
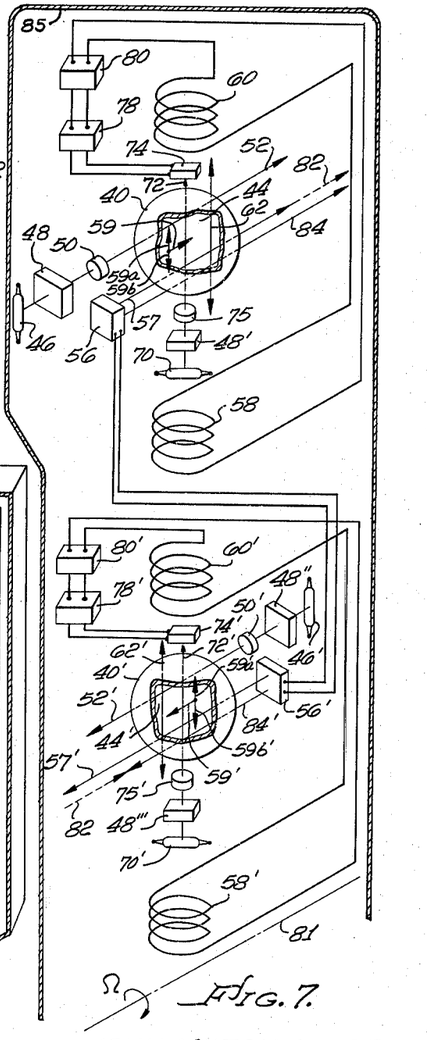
FIG. 7 is a pictorial representation of another steady state rotation rate measuring embodiment of this invention.

In another embodiment of this invention any variations in strength of a unidirectional magnetic field are effectively cancelled out so that only changes caused by an equivalent magnetic field are detected. FIG. 7 shows one arrangement of the apparatus of this invention in an embodiment that accomplishes this objective. In this embodiment a first gas cell means 40 contains a magnetic field responsive medium 44. A first optical pumping lamp means 46, first circular polarizer means 48, and first filter means 50 are oriented, with respect to the first gas cell means 40, to subject the magnetic field responsive medium 44 contained therein to an optical pumping light beam 52 in a preselected direction. A first unidirectional magnetic field generator means 56 is oriented to subject the magnetic field responsive medium in the first gas cell means 40 to a unidirectional magnetic field 57 in a direction substantially parallel to the preselected direction.

A first detection lamp means 70, second polarizer means 48', and a first detection light filter means 75 are oriented to subject the magnetic field responsive medium 44 within gas cell means 40 to an optical detection light beam 72 in a direction perpendicular to the preselected direction. A first detector means 74 receives the optical detection light beam 72 after so traversing the magnetic field responsive medium 44 and the output from the detector means 74 is fed through a first amplifier means 78 and a first phase control means 80 into a first set of coils 58 and 60. A second gas cell means 40', isolated from the apparatus associated with the first gas cell means 40, contains a magnetic field responsive medium 44', which is the same as the magnetic field responsive medium 44.

A second optical pumping lamp means 46', third polarizer means 48'', and second filter means 50' are oriented to subject the medium 44' to an optical pumping light beam 52' in a direction opposite to the preselected direction. A second magnetic field generator means 56' is oriented to subject the magnetic field responsive medium 44' to a unidirectional magnetic field 57' in a direction substantially parallel but opposite thereto, to the preselected direction. The second magnetic field generator means 56' is coupled to the first magnetic field generator means 56 so that any variations in unidirectional magnetic field strength are equal in the unidirectional magnetic field 57 and the unidirectional magnetic field 57'.

A second optical detection lamp means 70', fourth polarizer means 48''', and second detection light filter means 75' are oriented to subject the medium 44' to an optical detection light beam 72' in a direction substantially perpendicular to the preselected direction. A second detector means 74' is oriented to receive the optical light beam 72' after it traverses the medium 44' and the output from this second detector means 74' is fed through a second amplifier means 78', a second phase control means 80' and into a second set of coils 58' and 60'.

While the pictorial arrangement of FIG. 7 shows the first gas cell means 40 and its associated apparatus in one particular geometrical relationship with the second gas cell means 40' and its associated apparatus, it will be appreciated that any geometrical relationship between the first gas cell means 40 and the second gas cell means 40' and their respective associated apparatus that meets the above defined directional requirements will allow practice of this embodiment of this invention.

In operation, the magnetic field responsive medium 44 is subjected to an alternating magnetic field 62 generated by the first pair of coils 58 and 60 in a manner described in connection with the operation of the apparatus shown on FIG. 6. Similarly, the magnetic field responsive medium 44' is subjected to an alternating magnetic field 62' generated by the second set of coils 58' and 60'. A net magnetic moment vector 59 of the magnetic field responsive medium 44 precesses about the preselected direction and alternately appears as vectors 59a and 59b to the optical detection light beam 72. Likewise, the magnetic moment vector 59' precesses about the preselected direction and alternatively appears to the detection light beam 72' as vector 59a' and 59b'. All the apparatus described above that are associated with both the first gas cell means 40 and the second gas cell means 40', are coupled to body 85, which may be, for example, a space vehicle. When a rotation of the body 85 is induced by rotation inducing means, such as micrometeorites, there may be a rotation about an axis 81 parallel to the preselected direction as a unit with a constant angular rotational rate $\Omega$. Consequently, there is an equivalent magnetic field 82 that is additive with respect to the unidirectional magnetic field 57 and subtractive with respect to the unidirectional magnetic field 57'. An effective magnetic field that the medium 44 experiences is equivalent to the vector sum of the unidirectional magnetic field 57 and the equivalent magnetic field 82 and this is shown as the vector 84. Similarly, an effective magnetic field 84' that the medium 44' experiences is composed of the vector sum of the unidirectional magnetic field 57' and the equivalent magnetic field 82. Since the two unidirectional magnetic fields 57 and 57' are in opposite directions for the orientations shown, the effective magnetic field 84' is less than the effective magnetic field 84. Therefore, the precessional frequency of the magnetic moment vector 59 is increased from the value that it had when the apparatus was at rest and the precessional frequency of the magnetic moment vector 59' is decreased from the value that it had when it was at rest.

The frequency ($f_1$) measured by the first detector means 74 is governed by the equation:

$$f_1 = H\Gamma + \Omega$$

and the frequency ($f_2$) measured by the second detector means 74' is governed by the equation:

$$f_2 = H\Gamma - \Omega$$

subtracting the equations yields:

$$\frac{f_1 - f_2}{2} = \Omega$$

This method of measuring $\Omega$ is thus independent of any variations in the strength of the unidirectional magnetic fields 57 and 57' provided that such variations occur simultaneously in both medium 44 and 44'.

The arrangements of this invention may also be utilized to detect an angular rotation wherein the accuracy of the measurement of the angular rotation is unaffected by variations in the unidirectional magnetic field strength and in which only one gas cell means is utilized. This embodiment is shown on FIG. 8. A gas cell means 40 contains a magnetic field responsive medium 44. A first optical pumping lamp means 46, a first polarizer means 48, and a first filter means 50 are oriented to produce an optical pumping light beam 52 that traverses the medium in a preselected direction. A second optical pumping lamp means 46', second polarizer means 48', and second filter means 50' are oriented to provide a pumping light beam 52' that traverses the medium 44 in a direction opposite but parallel to the preselected direction. A first unidirectional magnetic field generating means 56 provides a unidirectional magnetic field 57 that traverses the medium in a direction parallel to the preselected direction. A second unidirectional magnetic field generator means 56' is oriented to subject the medium 44 to a unidirectional magnetic field 57' in a direction opposite to that of the unidirectional magnetic field 57 and parallel to the preselected direction. The first and second unidirectional magnetic field generators 56 and 56' are powered by a common source (not shown) through switching means 55. Therefore, unidirectional magnetic field 57 is equal in strength to unidirectional magnetic field 57'. An optical detection lamp means 70, third polarizer means 48'', and detection light filter means 75 are oriented to provide an optical detection light beam 72 that traverses the magnetic field responsive medium 44 in a direction perpendicular to the preselected direction. A detector means 74 is oriented to receive the optical detection light beam 72 after it traverses the medium 44 and to provide an output signal proportional to the intensity of the optical detection light beam 72. The output signal from detector 74 is amplified by amplifier means 78 and the phase of the signal is controlled by phase controller means 80. This is utilized to power an alternating magnetic field generating means 58 and 60. As a result, an alternating magnetic field 62 is provided that traverses the medium 44 in a direction parallel to the optical detection light beam 72. This arrangement is adapted to measure an angular rotation $\Omega$ about an axis 81 that is parallel to the preselected direction.

Figure 8:
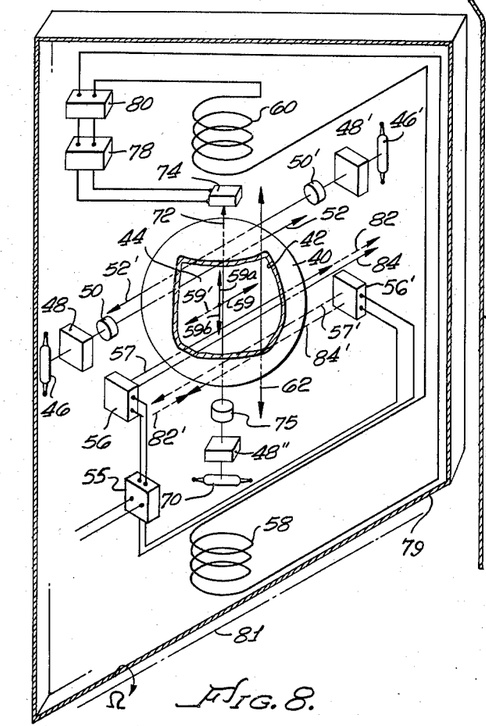
FIG. 8 is a pictorial representation of a sequentially operated rotational rate measuring embodiment of this invention.

In this embodiment the apparatus is cyclically operated to measure the rotation rate $\Omega$.

In this cyclic operation the first optical pumping lamp means 46, the first unidirectional magnetic field generator means 56 and the optical detection lamp 70 are simultaneously energized thereby providing their respective outputs. In accordance with the principles described above, the net magnetic moment 59 of the magnetic field responsive medium 44 is thereby aligned in a direction parallel to the unidirectional magnetic field 57. An induced precession of the net magnetic moment vector 59 occurs at the Larmor frequency wherein the net magnetic moment vector 59 precesses about the direction of the unidirectional magnetic field 57. This is illustrated schematically in FIG. 8 by lines 59a and 59b which show the net magnetic moment vector at two positions, ½ cycle apart, during its precession motion. The intensity of the detecting light beam 72 is modulated at this frequency and this cyclical change in intensity of the detecting light beam 72 is sensed by detector 74 which provides an output signal proportional thereto. The time necessary to achieve this stable precessional motion at the Larmor frequency is on the order of a few milliseconds.

The constant angular rotation rate $\Omega$ results in an equivalent magnetic field 82 which is additive with respect to the unidirectional magnetic field 57. Therefore, there is an effective magnetic field 84, and the precessional frequency of the magnetic moment vector 59 corresponds to the strength of this effective magnetic field 84. The first optical pumping lamp means 46 and first unidirectional magnetic field generator means 56 are de-energized, terminating their output and the second optical pumping lamp means 46' and the second unidirectional magnetic field generating means 56' are energized. This results in an initial alignment of the net magnetic moment vector 59 into the position shown by the vector 59', followed by precession about the unidirectional magnetic field 57' direction at the Larmor frequency. The direction of this precession is opposite to that described above. However, the equivalent magnetic field 82 caused by the constant rotational rate $\Omega$ is subtractive with respect to the unidirectional magnetic field 57' and, therefore, there is an effective magnetic field 84' which is less than the effective magnetic field 84. Consequently, the Larmor frequency is decreased to correspond to the strength of the effective magnetic field 84' and is less than the frequency corresponding to the strength of the effective magnetic field 84.

The difference between these two frequencies is, according to the equations delineated in the discussion of the embodiment shown on FIG. 7, equivalent to twice the angular rotation rate $\Omega$. Since, the time for achieving stabilized precession at the Larmor frequency is in the order of a few milliseconds, the apparatus of this embodiment may be cyclically operated at a comparatively rapid rate to provide almost a continuous sampling and measurement of the angular rotation rate $\Omega$.

In the practice of the embodiments of this invention, it is necessary that the magnetic field responsive medium be insulated from any stray and extraneous magnetic fields. If such stray magnetic fields were allowed to act upon the medium, the changes in the Larmor frequencies caused by a rotation, for example, might be overshadowed by changes in the Larmor frequencies due to the stray magnetic field. Therefore, in the preferred practice of the above-described embodiments of the invention, the apparatus is enclosed or in some manner insulated from stray magnetic fields, such as by a magnetic shield 79 shown on FIG. 8.

In some desired applications of this invention, however, it may not be possible to completely exclude all stray magnetic fields. In addition, there may also be some unknown variations in the strength of the applied unidirectional magnetic field. The principles of this invention may also be utilized in an apparatus to measure angular rotation wherein variations in the strength of an applied unidirectional magnetic field or stray magnetic fields have no effect on the accuracy of angular motion measurement. Such an embodiment is illustrated pictorially on FIG. 9.

Figures 9, 10, 11, 12:
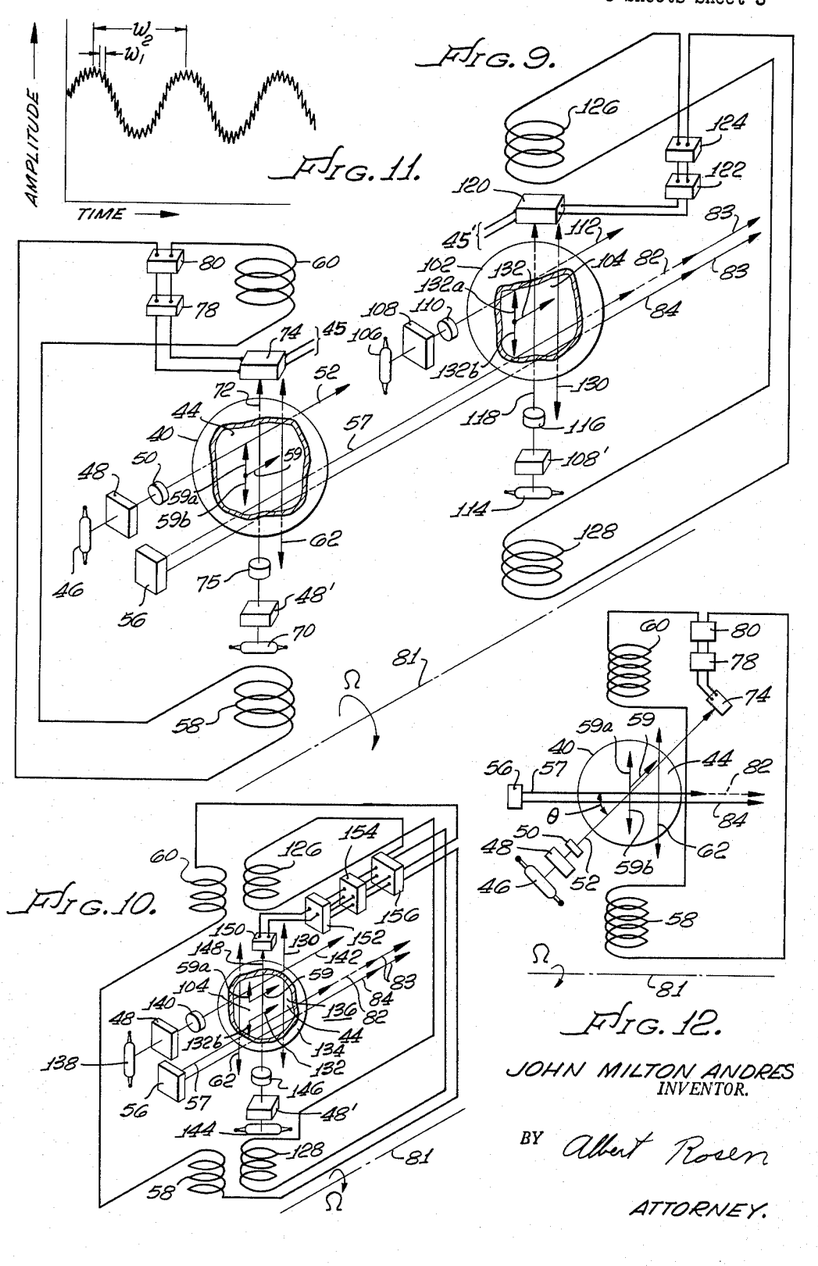
FIG. 9 is a pictorial representation of another steady state rotational rate measuring embodiment of this invention.
FIG. 10 is a pictorial representation of another steady state rotational rate embodiment of this invention.
FIG. 11 shows the waveforms associated with the operation of the embodiment shown on FIG. 10.
FIG. 12 shows another steady state rotational rate measuring embodiment according to the principles of this invention.

A first gas cell means 40 contains a magnetic field responsive medium 44. A first optical pumping lamp means 46 containing the same kind of particles that comprise the medium 44, a first polarizer means 48 and a first filter means 50 are oriented to subject the medium 44 to an optical pumping light beam 52 in a preselected direction. A first optical detection lamp means 70 containing the same kind of particles that comprise the medium 44, second polarizer means 48' and a first detection light filter means 75 are oriented to subject the medium 44 to an optical detection light beam 72 in a direction perpendicular to the preselected direction. A first detector means 74 is oriented to receive the optical detection light beam 72 and to provide an output signal proportional to the intensity of the optical detection light beam 72. This output from detector means 74 is fed through a first amplifier means 78 and a first phase control means 80 into a first alternating magnetic field generator means, illustrated as coils 58 and 60. The coils 58 and 60 are oriented to subject the medium 44 to an alternating magnetic field 62.

A second gas cell means 102 contains a magnetic field responsive means 104 that is different from the magnetic field responsive medium 44. A second optical pumping lamp means 106, containing the same type of particles that comprise the magnetic field responsive medium 104, a third polarizer means 108, and a second filter means 110 are oriented to subject the medium 104 to an optical pumping light beam 112 in the preselected direction. A second optical detection lamp means 114 containing the same kind of particles that comprise the medium 104, a fourth polarizer means 108' and a second detection light filter means 116 are oriented to subject the medium 104 to an optical detection light beam 118 in a direction perpendicular to the preselected direction. A second detector means 120 is oriented to receive the optical detection light beam 118 after it traverses the medium 104 and to provide an output signal proportional to the intensity of the optical detection light beam 118. The output signal from the detector means 120 is fed into a second amplifier means 122 and phase control means 124 and then into a second alternating magnetic field generating means, illustrated as coils 126 and 128. The coils 126 and 128 are oriented to subject the magnetic field responsive medium 104 to an alternating magnetic field 130 in a direction perpendicular to the preselected direction.

Output leads 45 are provided on first detector 74 and output leads 45' are provided on second detector 120 to allow, for example, presentation of these two detector output signals on an oscilloscope.

A unidirectional magnetic field generator means 56 is oriented to subject both the medium 44 and the medium 104 to a uniform unidirectional magnetic field 57. In the preferred embodiment of this invention, the unidirectional magnetic field 57 is generated by a single generator means 56 so that variations in the strength of the unidirectional magnetic field 57 will be experienced equally and simultaneously by both the medium 44 and the medium 104. However, it is possible to provide other arrangements whereby a plurality of unidirectional field generators are utilized; the only requirement being that both the medium 44 and the medium 104 be subjected to the same strength of unidirectional magnetic field simultaneously during operation.

In operation, the magnetic field responsive medium 44 is simultaneously subjected to the optical pumping light beam 52, optical detection light beam 72, alternating magnetic field 62, and unidirectional magnetic field 57 with the geometric relationships between these quantities as described above. Simultaneously, magnetic field responsive medium 104 is subjected to the optical pumping light beam 112, optical detection light beam 118, alternating magnetic field 130, and unidirectional magnetic field 57, also, with the geometric relationships as described above. A precession of the net magnetic moment 59 of medium 44 at its Larmor frequency about the preselected direction occurs and the net magnetic moment vector 59 alternately appears as vectors 59a and 59b during the precessional motion. Similarly, there is a precessional motion of the net magnetic moment vector 132 of medium 104 at its Larmor frequency about the preselected direction which alternatively as vectors 132a and 132b during this precessional motion.

Since medium 44 is not the same as medium 104, the precessional frequencies of their respective net magnetic moment vectors are unequal. When the entire apparatus is rotated about an axis 81 at an angular rate $\Omega$ and the axis 81 is parallel to the preselected direction, there is an equivalent magnetic field 82 that is additive with respect to the unidirectional magnetic field 57. This yields a resultant effective unidirectional magnetic field 84 whose strength is equivalent to the vector sum of equivalent magnetic field 82 and unidirectional field 57. In addition, there may be a stray magnetic field 83 that may be, for example, additive with respect to the unidirectional magnetic field 57. Thus, both medium 44 and 104 may be subjected to a total unidirectional magnetic field equivalent in strength of the vector sum of the effective magnetic field 84 and stray magnetic field 83.

The precessional frequency of the net magnetic moment 59 of medium 44 and the precessional frequency of the net magnetic moment 132 of medium 104 will change from the values obtained when only unidirectional field 57 was present. The changed value is equivalent to the Larmor frequency corresponding to the strength of a unidirectional magnetic field equivalent to the sum of the effective magnetic field 84 and stray magnetic field 83. The equations defining the precessional frequency in terms of the gyromagnetic ratio and magnetic field strength are similar to those delineated above:

$$f_1 = (H + H_s)\ \Gamma_1 + \Omega$$
$$f_2 = (H + H_s)\ \Gamma_2 + \Omega$$

Where:

$H$ = effective magnetic field strength
$H_s$ = stray magnetic field strength (The subscript "1" refers to magnetic field responsive medium 44. The subscript "2" refers to magnetic field responsive medium 104.)

Solving these two simultaneous equations and eliminating H and $H_s$ an expression for $\Omega$ is obtained:

$$\Omega = \frac{\Gamma_1 f_2 - \Gamma_2 f_1}{\Gamma_1 - \Gamma_2}$$

It can be seen that this expression is independent of the stray magnetic field strength, the unidirectional magnetic field strength and variations in these provided that the instantaneous values of each are experienced simultaneously by both the medium 44 and the medium 104.

It is also necessary that the gyromagnetic ratio of the medium 44 ($\Gamma_1$) does not equal the gyromagnetic ratio of the medium 104 ($\Gamma_2$). Table I, below, lists the gyromagnetic ratio for several different magnetic field responsive mediums.

TABLE I.—THE GYROMAGNETIC RATIO OF SEVERAL MAGNETIC FIELD RESPONSIVE MEDIUMS

| | Magnetic Field Responsive Medium | Atomic Weight | Gyromagnetic Ratio |
|---|---|---|---|
| 1 | Metastable helium (3S state) | 4 | 2.8 mc./gauss. |
| 2 | Rubidium | 87 | 700 kc./gauss. |
| 3 | Sodium | 23 | 700 kc./gauss. |
| 4 | Potassium | 39 | 700 kc./gauss. |
| 5 | Rubidium | 85 | 467 kc./gauss. |
| 6 | Cesium | 133 | 350 kc./gauss. |
| 7 | Cadmium | 113 | 948 c./gauss. |
| 8 | Cadmium | 111 | 906 c./gauss. |
| 9 | Mercury | 199 | 768 c./gauss. |

It will be appreciated that only representative magnetic field responsive mediums are listed in Table I to illustrate the wide variation in gyromagnetic ratios that are obtainable. There are many other magnetic field responsive mediums that may be selected for utilization in the practice of this invention. For the particular embodiment illustrated on FIG. 9, it is only necessary that the magnetic field responsive mediums actually selected have different gyromagnetic ratios. In the preferred embodiment this difference should be as large as possible. For example, medium 44 may be metastable helium and medium 104 may be mercury.

FIG. 10 illustrates the apparatus associated with another embodiment of this invention in which measurement of an angular rotation rate may be made and the accuracy of measurement is independent of both variations in a unidirectional magnetic field and stray magnetic fields. In this embodiment, which is similar to the embodiment shown on FIG. 9, a gas cell means 134 contains a magnetic field responsive medium mixture 136 composed of two magnetic field responsive mediums 44 and 104. The medium 44 has a gyromagnetic ratio different than the gyromagnetic ratio of the medium 104. An optical pumping lamp means 138, a polarizer means 48, and filter means 140 are oriented to subject the mixture 136 to an optical pumping light beam 142 in a preselected direction.

The optical pumping light beam 142 contains energy in those wavelengths necessary to effect a transition of both medium 44 and medium 104 into a preferred energy state. Thus, for example, the optical pumping lamp 138 may be one lamp containing particles that comprise both the medium 44 and particles that comprise the medium 104; or separate pumping lamps, each emitting electromagnetic radiation corresponding to the required wavelengths for effecting the preferred energy state condition of medium 44 and medium 104, respectively, may be utilized. Similarly the filter means 140 preferably transmits only energy in the wavelengths required to effect this preferred energy condition of both magnetic field responsive mediums 44 and 104.

A unidirectional magnetic field generator means 56 is oriented to subject the medium mixture 136 to a unidirectional field 57 in the preselected direction. An optical detection lamp means 144, a second polarizer means 48' and detection light filter means 146 are oriented to subject the medium mixture 136 to an optical detection light beam 148 in a direction perpendicular to the preselected direction. The optical detection lamp means 144 has the same characteristics that are associated with the optical pumping lamp means 138 described above. The detection light filter means 146 preferably transmits energy substantially only in those wavelengths associated with the energy separation between, for example, the ground state and the first optically excited state of the mediums 44 and 104. A detector means 150 is oriented to receive the optical detection light beam 148 after it traverses the medium mixture 136 and to provide an output signal proportional to the intensity of the optical detection light beam 148.

Two alternating magnetic field generating means, such as the pair of coils 126 and 128 and the pair of coils 58 and 60, are oriented to subject the medium mixture 136 simultaneously to two alternating magnetic fields: 62 and 130.

In operation the medium mixture 136 is simultaneously subjected to the optical pumping light beam 142, optical detection light beam 148, unidirectional magnetic field 57, alternating magnetic field 130, and alternating magnetic field 62, in the above described directions. Simultaneously there is an angular rotation rate $\Omega$ of the apparatus about an axis 81 that is parallel to the preselected direction. This results in an equivalent magnetic field 82 that is additive with respect to the unidirectional magnetic field 57 and which yields a resultant effective magnetic field 84 that is sensed by the medium mixture 136.

The output from detector means 150, in this embodiment, may be considered to be composed of two frequencies superimposed upon each other, as shown in FIG. 11. The frequency $f_1$ corresponding to the wavelength $w_1$, shown on FIG. 11 is the Larmor frequency corresponding to the strength of effective magnetic field 84 of the medium 44 which has a comparatively large gyromagnetic ratio. The frequency $f_2$ corresponding to the wavelength $w_2$ shown on FIG. 11 is the Larmor frequency corresponding to the strength of the effective magnetic field 84 of the medium 104 that has a comparatively small gyromagnetic ratio. When these two frequencies are different in value the medium 44 is unaffected by an alternating magnetic field of the frequency $f_2$ and, similarly, the medium 104 is unaffected by an alternating magnetic field of frequency $f_1$. The output from the detector means 150 is fed into a frequency separation means 152 which, by well known means, divides the output signal into two signals: one signal of the frequency $f_1$ and one signal of the frequency $f_2$. These two frequencies are then amplified in amplifier means 154 and their respective phases controlled in phase control means 156. The amplified and phase controlled signal at frequency $f_1$ is then fed into the pair of coils 58 and 60 which establish the alternating magnetic field 62. Similarly, the amplified and phase controlled signal at frequency $f_2$ is fed into coils 126 and 128 which establish the alternating magnetic field 130. There is a resultant induced precession of the magnetic moment of each of the mediums 44 and 104. The net magnetic moment 59 of the medium 44 precesses at a frequency corresponding to $f_1$ and the net magnetic moment 132 of the magnetic field responsive medium 104 precesses at the frequency $f_2$. Both of these precessional motions are about the preselected direction. These two precessing magnetic moments independently modulate the optical detection light beam 148 and result in the output signal from detector means 150 described above. These two frequencies in the output signal and the gyromagnetic ratios of the medium 44 and 104 are utilized to compute the angular rotation rate Ω in accordance with the equations delineated in connection with the embodiment of FIG. 9.

It is also possible, according to the principles of this invention, to combine an optical pumping light beam and an optical detection light beam into a single light beam that performs the functions of both. The apparatus associated with this embodiment is shown on FIG. 12. For convenience the single light beam is referred to in the description of this embodiment, as the optical pumping light beam, although it will be appreciated that this beam both optically pumps a magnetic field responsive medium 44 and is detected after traversing the magnetic field responsive medium 44 to indicate the precessional frequency of a net magnetic moment 59. A gas cell means 40 contains the magnetic field responsive medium 44. An optical pumping lamp means 46, polarizer means 48, and filter means 50 are oriented to subject the magnetic field responsive medium 44 to an optical pumping light beam 52 in a preselected direction. A unidirectional magnetic field generating means 56 is oriented to subject the magnetic field responsive medium 44 to a unidirectional magnetic field 57 in a direction making an angle θ with the preselected direction. A detector means 74 is oriented to receive the optical pumping light beam 52 after it traverses the magnetic field responsive medium 44 and to provide a signal proportional to the intensity of the optical pumping light beam 52. The output from the detector 74 is fed into an amplifier means 78 and phase control means 80, and then into an alternating magnetic field generating means illustrated on FIG. 12 by coils 58 and 60. The coils 58 and 60 are oriented to subject the magnetic field responsive medium 44 to an alternating magnetic field 62 in a direction perpendicular to the unidirectional field 57.

In operation the magnetic field responsive medium is simultaneously subjected to the optical pumping light beam 52 and unidirectional magnetic field 57. At first the particles comprising the magnetic field responsive medium 44 tend to align themselves parallel to the preselected direction. However, the presence of the unidirectional magnetic field 57 at an angle θ to the preselected direction tends to induce alignment parallel to itself. This induces a precessional motion of the net magnetic moment 59 and, as described in connection with the other embodiments of this invention when the precessional frequency is the Larmor frequency, this procession will occur in a plane perpendicular to the unidirectional magnetic field 57 as illustrated by the vectors 59a and 59b. As a result, there is a component of this precessing net magnetic moment 59 sensed by the optical pumping light beam 52 and, to the optical pumping light beam 52, it appears to be in a magnetic substrate other than the $m_f = +2$ magnetic substrate. Therefore, energy is cyclically absorbed from the pumping light beam 52 and the detector 74 measures this cyclical change in intensity of the optical pumping light beam 52, thereby providing the alternating magnetic field 62 whose frequency is the same as the precessing net magnetic moment 59.

When there is an angular rotation Ω of the apparatus about an axis 81 that is parallel to the unidirectional magnetic field 57, there is an equivalent magnetic field 82 that is parallel to the unidirectional magnetic field 57. The medium then senses an effective magnetic field 84 that is equal in strength to the vector sum of unidirectional magnetic field 57 and equivalent magnetic field 82. The precessional frequency of the net magnetic moment 59 corresponds, during rotation, to the Larmor frequency for the strength of the effective magnetic field 84 and the difference between this frequency and the precessional frequency under static conditions is a measure of the angular rotation rate Ω.

In the embodiments of this invention wherein an angular rotation rate about an axis parallel to an applied unidirectional magnetic field is measured, it is apparent that a plurality of such embodiments may be incorporated into a two or three axes gyro system for utilization in, for example, a boat, airplane, missile or space vehicle. It will also be appreciated that a single gas cell with a multiplicity of unidirectional magnetic field generators, alternating magnetic field generators, pumping light beams and detection light beams, wherein these items are properly oriented along three orthogonal axes and sequentially operated, may also be utilized in a three axes gyro system. Since the time interval for obtaining precession of a net magnetic moment of a magnetic field responsive medium about a unidirectional magnetic field is on the order of milliseconds, the sampling rate of sequential operations in such an embodiment can be quite rapid, and thereby provide virtually continuous measurement of any rotation.

There are many other arrangements and combinations of the apparatus associated with this invention that are possible in addition to the ones described above in the specific embodiments. For example, since a precessing net magnetic moment rotates in a plane, an alternating magnetic field and an optical detection light beam may be oriented anywhere in the plane containing the precessing net magnetic moment vector. Therefore, this invention is not limited to the specific embodiments wherein illustrated and described, and the following claims are intended to cover all changes, combinations, and modifications which do not depart from the true scope and spirit of the invention.

What is claimed as new and is desired to be secured by Letters Patent of the United States is:

1. A gyromagnetic apparatus comprising, in combination: first gas cell means having walls defining a first cavity; second gas cell means having second walls defining a second cavity wherein said first and said second walls are transparent to magnetic energy and to at least preselected wavelengths of electromagnetic radiation; a first magnetic field responsive medium, having a first gyromagnetic ratio, contained within the first cavity; first optical pumping light beam generating means oriented to subject the first medium to a first optical pumping light beam in a preselected direction; a second magnetic field responsive medium, having a second gyromagnetic ratio different than the first gyromagnetic ratio, contained within the second cavity; second optical pumping light beam generating means oriented to subject the second medium to a second optical pumping light beam in the preselected direction; unidirectional magnetic field generating means oriented to subject the first and the second medium to a uniform, unidirectional magnetic field, equal in strength in both mediums; a first alternating magnetic field generating means oriented to subject the first medium to a first alternating magnetic field in a direction perpendicular to the preselected direction; second alternating magnetic field generating means oriented to subject the second medium to a second alternating magnetic field in a direction perpendicular to the preselected direction; first optical detection light beam generating means oriented to subject the first medium to a first optical detection light beam in a direction perpendicular to the preselected direction; second optical detection light beam generating means oriented to subject the second medium to a second optical detection light beam in a direction perpendicular to the preselected direction; first optical detector means oriented to receive the first optical detection light beam after it traverses the first medium and adapted to provide a first output signal proportional to the intensity of the first optical detection light beam detected; first output signal amplifying and phase control means coupled to said first detector means and said first alternating magnetic field generating means to provide a control signal to control the frequency of the first alternating magnetic field; second optical detector means oriented to receive the second optical light beam after it traverses the second medium and adapted to provide a second output signal proportional to the intensity of the second optical detection light beam detected; second amplifier and phase control means coupled to said second detector means and said second alternating magnetic field generating means to provide a second control signal to provide a control signal to control the frequency of the second magnetic field.

2. The apparatus as defined in claim 1 wherein the first and second magnetic field responsive mediums are selected from the class consisting of metastable helium, thallium, rubidium 87, rubidium 85, sodium 23, potassium 39, cesium 133, cadmium 113, cadmium 111, and mercury 199.

3. The apparatus as defined in claim 1 wherein the first and the second magnetic field responsive mediums are a vapor.

4. The apparatus as defined in claim 1 wherein the first and the second magnetic field responsive mediums comprise a gas.

5. The apparatus as defined in claim 1 wherein the first and the second magnetic field responsive mediums comprise a fluid.

6. An apparatus for measuring the angular rotation rate of a body comprising:
- means mounted to rotate with said body for separately containing a plurality of different magnetic field responsive materials having different gyromagnetic ratios;
- means mounted for rotation with said body for subjecting both said mediums to unidirectional magnetic fields in a manner such that undesirable field strength variations which tend to occur are necessarily applied equally and simultaneously to both said mediums;
- optical pumping means oriented to establish a net magnetic moment in each of said materials;
- alternating magnetic field generating means oriented to drive each magnetic moment at its Larmor frequency; and
- means mounted for rotation with said body and responsive to optical radiation propagated in the zone of said mediums and passing from said containment means, for generating electrical signal components corresponding to the Larmor frequencies of each of said magnetic moments, and output means presenting said signal components for indication and measurement thereof, whereby measurement of said frequencies provides information relating to the angular rotation of said body.

7. An apparatus for measuring the angular rotation rate of a body comprising:
- means mounted to rotate with said body for separately containing a plurality of different magnetic field responsive materials having different gyromagnetic ratios;
- means mounted for rotation with said body for subjecting both said mediums to unidirectional magnetic fields in a manner such that undesirable field strength variations which tend to occur are necessarily applied equally and simultaneously to both said mediums;
- optical pumping means oriented to establish a net magnetic moment in each of said materials;
- means to induce a precession of the net magnetic moment of each material at its Larmor frequency; and
- means mounted for rotation with said body and responsive to optical radiation propagated in the zone of said mediums and passing from said containment means, for generating electrical signal components corresponding to the Larmor frequencies of each of said magnetic moments, and output means presenting said signal components for indication and measurement thereof, whereby measurement of said frequencies provides information relating to the angular rotation of said body.

8. A gyromagnetic apparatus for measuring the angular rotation rate of a body which rotates about an axis having a first direction, said apparatus comprising:
- containment means mounted for rotation with said body to retain first and second magnetic field responsive mediums, each of said mediums having an orientable net magnetic moment;
- means mounted for rotation with said body for subjecting both said mediums to unidirectional magnetic fields in a manner such that undesirable field strength variations which tend to occur are necessarily applied equally and simultaneously to both said mediums;
- optical pumping means for establishing the net magnetic moments of said first and the second magnetic field responsive mediums in said first direction;
- means for inducing a precession of the net magnetic moment of the first medium at a first frequency in a first plane perpendicular to said first direction and for inducing a precession of the net magnetic moment of the second medium at a second frequency different than said first frequency in a second plane perpendicular to said first direction, with said containment means being spaced from and oriented with respect to said axis in a manner such that rotation of said body about said axis induces a precession of the net magnetic moment of said first medium in said first plane at a third frequency different than said first frequency and induces a precession of the net magnetic moment of said second medium in said second plane at a fourth frequency different than said second frequency; and
- means mounted for rotation with said body and responsive to optical radiation propagated in the zone of said mediums and passing from said containment means, for generating electrical signal components at said first, second, third, and fourth frequencies, and output means presenting said signal components for indication and measurement thereof, whereby measurement of said frequencies provides information relating to the angular rotation rate of said body.

References Cited by the Examiner

UNITED STATES PATENTS

| 2,228,367 | 1/41 | Sanders | 74—5.6 X |
| 2,589,494 | 3/52 | Hershberger | 74—5.4 X |
| 2,720,625 | 10/55 | Leete | 324—0.5 X |
| 2,793,360 | 5/57 | Beaumont | 340—347 |
| 2,841,760 | 7/58 | Hansen | 324—0.5 |
| 2,951,992 | 9/60 | Arditi | 331—3 |
| 2,955,262 | 10/60 | Arditi | 331—3 |
| 3,071,721 | 1/63 | Dehmelt | 324—0.5 |
| 3,103,621 | 9/63 | Fraser | 324—0.5 |

FOREIGN PATENTS 180,405   5/22   Great Britain.

OTHER REFERENCES

Holahan, Space/Aeronautics, vol. 31, May 1959, pp. 130 to 133 inclusive.

Physical Review, 107, 1559–1565, Sept. 15, 1957.

J. Geophysical Research, 63, 277–288 (June 1958).

CHESTER L. JUSTUS, *Primary Examiner.*

MAYNARD R. WILBUR, ARTHUR M. HORTON, BROUGHTON G. DURHAM, *Examiners.*